(12) United States Patent
Egawa

(10) Patent No.: US 6,572,264 B1
(45) Date of Patent: Jun. 3, 2003

(54) RADIATION CLINICAL THERMOMETER

(75) Inventor: Shunji Egawa, Tokyo (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/622,149

(22) PCT Filed: Dec. 15, 1999

(86) PCT No.: PCT/JP99/07038

§ 371 (c)(1),
(2), (4) Date: Aug. 11, 2000

(87) PCT Pub. No.: WO00/35339

PCT Pub. Date: Jun. 22, 2000

(30) Foreign Application Priority Data

Dec. 15, 1998 (JP) .................................... 10-356715

(51) Int. Cl.[7] .............................. G01J 5/10; G01K 1/20; G01K 7/00; G01K 11/00; A61B 6/00
(52) U.S. Cl. .................... 374/133; 374/126; 374/129; 374/130; 374/131; 374/132; 600/474; 702/135; 702/136
(58) Field of Search ................................ 374/126, 128, 374/129, 132; 702/130, 131, 135–136, FOR 142; 600/474

(56) References Cited

U.S. PATENT DOCUMENTS

| | | | | |
|---|---|---|---|---|
| 5,231,595 A | * | 7/1993 | Makino et al. | 374/126 |
| 5,232,284 A | * | 8/1993 | Egawa et al. | 374/126 |
| 5,293,877 A | * | 3/1994 | O'Hara et al. | 128/736 |
| 5,836,692 A | * | 11/1998 | Pompei | 374/121 |
| 5,860,740 A | * | 1/1999 | Fujima | 374/126 |
| 6,152,595 A | * | 11/2000 | Beerwerth et al. | 374/131 |
| 6,203,193 B1 | * | 3/2001 | Egawa | 374/126 |
| 6,241,384 B1 | * | 6/2001 | Pompei et al. | 374/126 |
| 6,292,685 B1 | * | 9/2001 | Pompei | 374/126 |

* cited by examiner

Primary Examiner—Diego Gutierrez
Assistant Examiner—Gail Verbitsky
(74) Attorney, Agent, or Firm—Townsend and Townsend and Crew LLP

(57) ABSTRACT

To provide a radiation thermometer capable of measuring a body temperature more accurately than it has been conventionally possible, by taking into account an infrared ray that is emitted from a front end of the probe portion and reflected from an eardrum or an external acoustic opening. The radiation thermometer has body temperature calculating means for calculating a body temperature according to a predetermined arithmetic expression based on an emissivity when the emissivity of the eardrum or the external acoustic opening is less than 1, an output of infrared-ray detecting means and an output of temperature-measuring means.

18 Claims, 12 Drawing Sheets

OPERATION SIGNAL

OPERATION SIGNAL

RADIATION CLINICAL THERMOMETER

BACKGROUND OF THE INVENTION

1. Field of the Invention

The present invention relates to a radiation thermometer.

2. Description of the Prior Art

For the purpose of measuring a body temperature in a short period of time, a radiation thermometer which selects an eardrum as a measurement site and measures a temperature of the eardrum in a non-contact manner has been already proposed.

An example is a radiation thermometer which is disclosed in Japanese Laid-open Patent Publication No. 28524/1990. This radiation thermometer allows a front end of a probe portion, which comprises a window member at a front end and an infrared ray sensor at a rear end, to be inserted into an external acoustic opening, so that an infrared ray from the eardrum is received by the infrared ray sensor through the window member, and the temperature of the eardrum, i.e. the body temperature, is measured based on the intensity of the received infrared ray.

Since this type of radiation thermometer measures a body temperature based on the intensity of an infrared ray from the eardrum, the cleanliness of the optical system which receives the infrared ray has influence on measurement accuracy. However, an external acoustic opening becomes dirty because of earwax and the like, and therefore, measuring a body temperature several times causes a problem in that the window member serving as an optical system of the front end of the probe portion is gradually smudged. Further, it is unhygienic where more than one person shares the same radiation thermometer.

To solve this problem, the radiation thermometer disclosed in Japanese Laid-open Patent Publication No. 28524/1990 comprises a probe cover designed to cover the front end of the probe portion which is inserted into an external acoustic opening. The probe cover prevents the probe portion of the radiation thermometer from directly contacting the external acoustic opening. In addition, since the probe cover is disposable after each measurement of a body temperature, there is no problem in that a dirty optical system deteriorates a measurement accuracy, and there is no hygienic problem.

However, when -a probe cover is used as in the case of the radiation thermometer disclosed in Japanese Laid-open Patent Publication No. 28524/1990 described above, a new probe cover is necessary each time a body temperature is measured, which is costly. Hospitals, in particular, which need to measure body temperatures frequently, must bear a considerable running cost.

Further, since a conventional radiation thermometer which uses probe covers requires discarding the probe cover each time a body temperature is measured, it is necessary to procure new probe covers often, which is labor-consuming.

To solve this problem, the present applicant has proposed a radiation thermometer having a probe portion of a waterproof structure in Japanese Patent Application No. 244970/1992.

In the radiation thermometer disclosed in Japanese Patent Application No. 244970/1992, as the probe portion has a waterproof structure, it is possible to disinfect and clean a portion of the front end of the radiation thermometer to be put into the external acoustic opening by using alcohol or a detergent after measurement of a body temperature has been finished. Therefore, it is possible to maintain the radiation thermometer always in a hygienic condition. Further, it is possible to avoid deterioration in the accuracy of measuring a temperature due to the dirtiness of the optical system. Further, as a probe cover is not necessary, it is possible to cut the running cost involved in the purchase of the probe covers.

In the above-described radiation thermometer, a body temperature is measured by receiving an infrared ray from the eardrum or the external acoustic opening by an infrared ray sensor and by detecting the intensity of the infrared ray.

As described above, the conventional radiation thermometer measures the body temperature assuming that an infrared ray incident to the infrared ray sensor is only from the eardrum or the external acoustic opening.

However, the inventor of the present application has found that a temperature is measured at a lower level than an actual temperature, when a temperature was measured by using the conventional radiation thermometer. Therefore, in an extreme case, there has been such risk that the conventional radiation thermometer displays a measured body temperature at a lower level even when a person has a fever due to a cold or the like and a decision is made that he has a normal body temperature.

SUMMARY OF THE INVENTION

In the light of the above discussion, it is an object of the present invention to provide a radiation thermometer that is designed to measure a body temperature more accurately than a conventional radiation thermometer.

In order to achieve the above object, the present invention is characterized in that a radiation thermometer comprises: infrared-ray detecting means; a probe portion having a front end to be inserted into a hole portion of a living being and an introduction opening provided at the front end for guiding an infrared ray emitted from the hole portion of the living being to the infrared-ray detecting means; temperature-measuring means for measuring a temperature of the probe portion; and calculating means for calculating a body temperature of the living being based on detected values from the infrared-ray detecting means and the temperature-measuring means, wherein the calculating means has body temperature calculating means for calculating a body temperature of the living being according to a predetermined arithmetic expression based on an emissivity of the hole portion of the living being when the emissivity is less than 1, an output of the infrared-ray detecting means and an output of the temperature-measuring means.

Further, the invention is characterized in that the probe portion has a shape to fill almost the whole hole portion of the living being when the probe portion is inserted into the hole portion of the living being.

Further, the invention is characterized in that the body temperature calculating means includes a process for dividing an output of the infrared-ray detecting means by the emissivity.

Further, the invention is characterized in that the temperature-measuring means serves as temperature-measuring means for measuring a temperature of the infrared-ray detecting means.

Further, the invention is characterized in that the temperature-measuring means comprises a first temperature-measuring means for measuring a temperature of the probe portion and a second temperature-measuring means for measuring a temperature of the infrared-ray detecting means.

Further, the invention is characterized in that the predetermined arithmetic expression is $$T_b = (T_0^4 + V_b/Ke)^{1/4}$$

where $T_b$ represents a temperature of the hole portion of the living being, $T_0$ represents a temperature of the infrared-ray detecting means, $V_b$ represents an output of the infrared-ray detecting means, K represents a constant, and e represents an emissivity of the hole portion of the living being.

Further, the invention is characterized in that the predetermined arithmetic expression is a primary expression that approximates a temperature ($T_b$) of the hole portion of the living being by a temperature ($T_0$) of the infrared-ray detecting means, an output ($V_b$) of the infrared-ray detecting means, and an emissivity (e) of the hole portion of the living being.

Further, the invention is characterized in that the predetermined arithmetic expression is $$T_b = T_0 + V_b/K_1 e$$

where $T_b$ represents a temperature of the hole portion of the living being, $T_0$ represents temperature of the infrared-ray detecting means, $V_b$ represents an output of the infrared-ray detecting means, $K_1$ represents a constant, and e represents an emissivity of the hole portion of the living being.

Further, the invention is characterized in that the predetermined arithmetic expression is $$T_b = \{[V_b/K + T_0^4 - (1-e)T_p^4]/e\}^{1/4}$$

where $T_b$ represents a temperature of the hole portion of the living being, $V_b$ represents an output of the infrared-ray detecting means, K represents a constant, $T_0$ represents a temperature of the infrared-ray detecting means, e represents an emissivity of the hole portion of the living being, and $T_p$ represents a temperature of the probe portion.

Further, the invention is characterized in that the probe portion has a light-guiding pipe for guiding an infrared ray emitted from the introduction opening to the infrared ray sensor and case means for covering the light-guiding pipe, with a space formed between the light-guiding pipe and the case means, and the second temperature-measuring means is provided between the case means and the light-guiding pipe such that the second temperature-measuring means is in contact with the case means but is not in contact with the light-guiding pipe.

Further, the invention is characterized in that a member of the front end of the probe portion has a thermal capacity to such extent that a temperature does not change suddenly during a period of time required for calculating a body temperature of the living being.

Further, the invention is characterized in that the front end of the probe portion has a window member provided at the introduction opening.

Further, the invention is characterized in that the window member is made of calcium fluoride, silicon or barium fluoride having a thickness of 0.3 mm or more.

Further, the invention is characterized in that the hole portion of the living being is an external acoustic opening of a human being, and the emissivity is set to 0.90 to 0.98.

Further, the invention is characterized in that the radiation thermometer has emissivity setting means for setting the emissivity.

Further, the invention is characterized in that the radiation thermometer has peak value detecting means for detecting a peak value of the infrared-ray detecting means, and an output of the infrared-ray detecting means that is used by the calculating means for the calculation is the peak value.

Further, the invention is characterized in that a radiation thermometer comprises: infrared-ray detecting means; a probe portion having a front end to be inserted into a hole portion of a living being and an introduction opening provided at the front end for guiding an infrared ray emitted from the hole portion of the living being to the infrared-ray detecting means; temperature-measuring means for measuring a temperature of the probe portion; emissivity selecting means for selecting either an emissivity of the hole portion of the living being when the emissivity is less than 1 or 1.00 as the emissivity of a temperature-measured object; and calculating means for calculating a temperature of the temperature-measured object based on an output of the infrared-ray detecting means, an output of the temperature-measuring means, and an emissivity selected by the emissivity setting means.

Further, the invention is characterized in that the radiation thermometer has a measuring switch for starting a measuring operation, and the emissivity selecting means selects an emissivity according to the operation of the measuring switch.

DETAILED DESCRIPTION OF SPECIFIC EXEMPLARY EMBODIMENTS

Embodiments of the present invention will be explained below with reference to the drawings.

Figure 1:
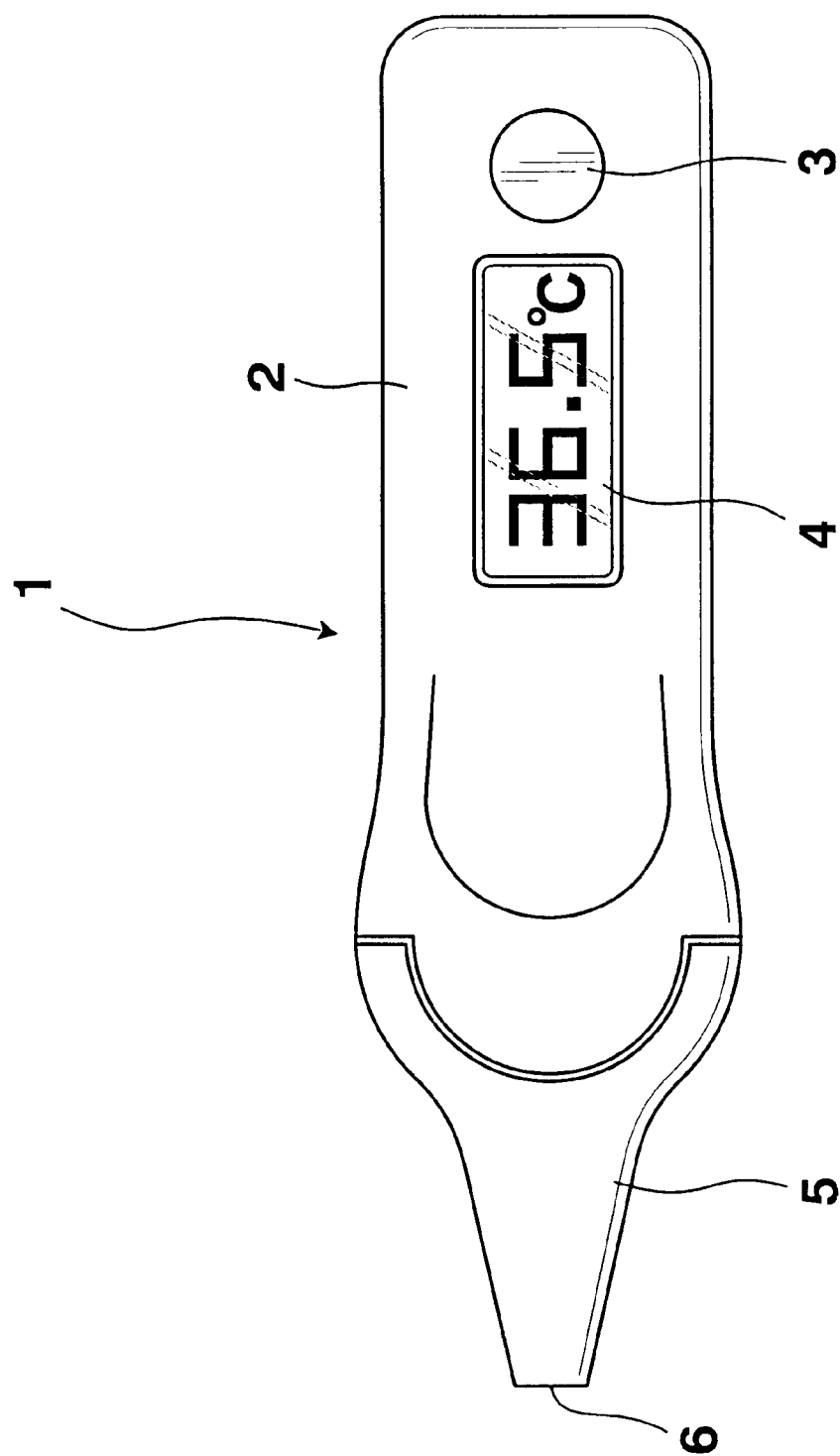
FIG. 1 is a schematic view of a first embodiment of a radiation thermometer according to the present invention.

FIG. 1 is a schematic view of a first embodiment of a radiation thermometer according to the present invention.

As shown in FIG. 1, a radiation thermometer 1 has a measuring switch 3 and a display 4 on case means 2. A probe portion 5 is provided at the front end of the case means 2.

The probe portion 5 has a conical trapezoidal shape with its diameter gradually increasing from the front end toward the rear end. The probe portion 5 is structured such that when the probe portion 5 is inserted into an external acoustic opening, the external acoustic opening is almost filled with a portion of the probe portion 5 thicker than the external acoustic opening. The shape of the probe portion is not necessarily limited to this so long as the probe portion substantially fills the external acoustic opening.

For measuring a body temperature, the measuring switch 3 is depressed, and then the front end of the probe portion 5 is inserted into an external acoustic opening 11. The radiation thermometer 1 starts the measurement immediately after the measuring switch 3 has been depressed. After starting the measurement, the front end of the probe portion 5 is inserted into the external acoustic opening 11 and the measurement is finished based on a predetermined condition. Of infrared rays that have been put into an introduction opening 6 at the front end of the probe portion 5 during this period, an output of an infrared ray sensor 18 corresponding to a peak value is used to calculate a temperature. This temperature is displayed as a body temperature. As the radiation thermometer 1 is usually placed under a temperature environment lower than the body temperature, the probe portion 5 is almost at the same temperature as this environmental temperature. Therefore, when the probe portion 5 has been inserted into the external acoustic opening 11, the temperature of the external acoustic opening 11 is cooled by the probe portion 5. Thus, usually, the peak value becomes a value corresponding to the infrared ray that has been incident to the introduction opening 6 at the front end of the probe portion 5 after the infrared ray has been emitted from an eardrum 12 or the external acoustic opening 11 either during a process of inserting the front end of the probe portion 5 into the external acoustic opening 11 or immediately after the front end of the probe portion 5 has been inserted into the external acoustic opening 11.

The case means 2 and the probe portion 5 are made of a material such as, for example, an ABS resin.

Figure 2:
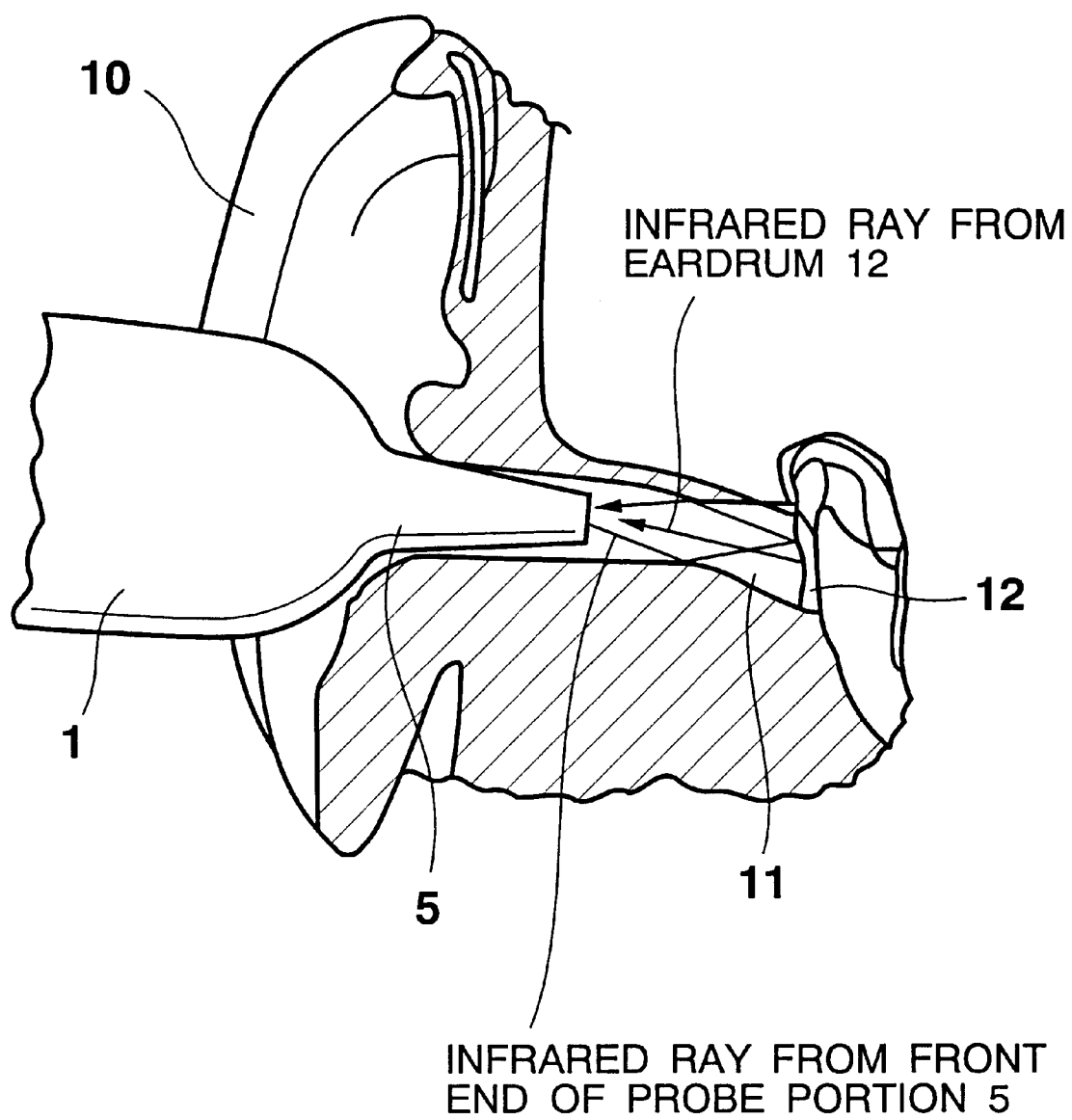
FIG. 2 shows a manner of measuring a body temperature with a radiation thermometer shown in FIG. 1 inserted into an ear.

FIG. 2 shows how a body temperature is measured with the radiation thermometer 1 shown in FIG. 1 which is inserted into an ear.

For measuring a body temperature, the probe portion 5 at the front end of the radiation thermometer 1 is inserted into the external acoustic opening 11 of an ear 10, and infrared rays from the eardrum 12 and the external acoustic opening 11 are received, as shown in FIG. 2.

At the time of inserting the probe portion 5 at the front end of the radiation thermometer 1 into the external acoustic opening 11 of the ear 10, it is recommended to insert the probe portion 5 into the external acoustic opening 11 so as to fill the external acoustic opening 11 substantially. This is intended for preventing an infrared ray from entering the introduction opening 6 of the radiation thermometer 1 from a surrounding environment other than the eardrum 12 and the external acoustic opening 11.

The inventor has noticed that, in this measuring state, infrared rays that are incident to the radiation thermometer 1 are not only the infrared rays emitted from the eardrum 12 and the external acoustic opening 11. In other words, the inventor has found that infrared rays that are emitted from the front end of the probe portion 5 and are reflected from the eardrum 12 and the external acoustic opening 11 are also incident onto the radiation thermometer 1.

The infrared rays that are emitted from the front end of the probe portion 5 and are reflected from the eardrum 12 and the external acoustic opening 11 have not been taken into account in the conventional radiation thermometer.

Since the front end of the probe portion 5 is almost at the same temperature as the external temperature, which is at a lower temperature than the temperatures of the eardrum 12 and the external acoustic opening 11, the conventional radiation thermometer tends to measure a temperature at a lower temperature than the actual temperature.

Therefore, the present invention has taken into consideration the existence of infrared rays that are emitted from the front end of the probe portion 5 and are reflected from the eardrum 12 and the external acoustic opening 11. Thus, in the present invention, such existence is reflected in the calculation of a body temperature.

Figure 3:
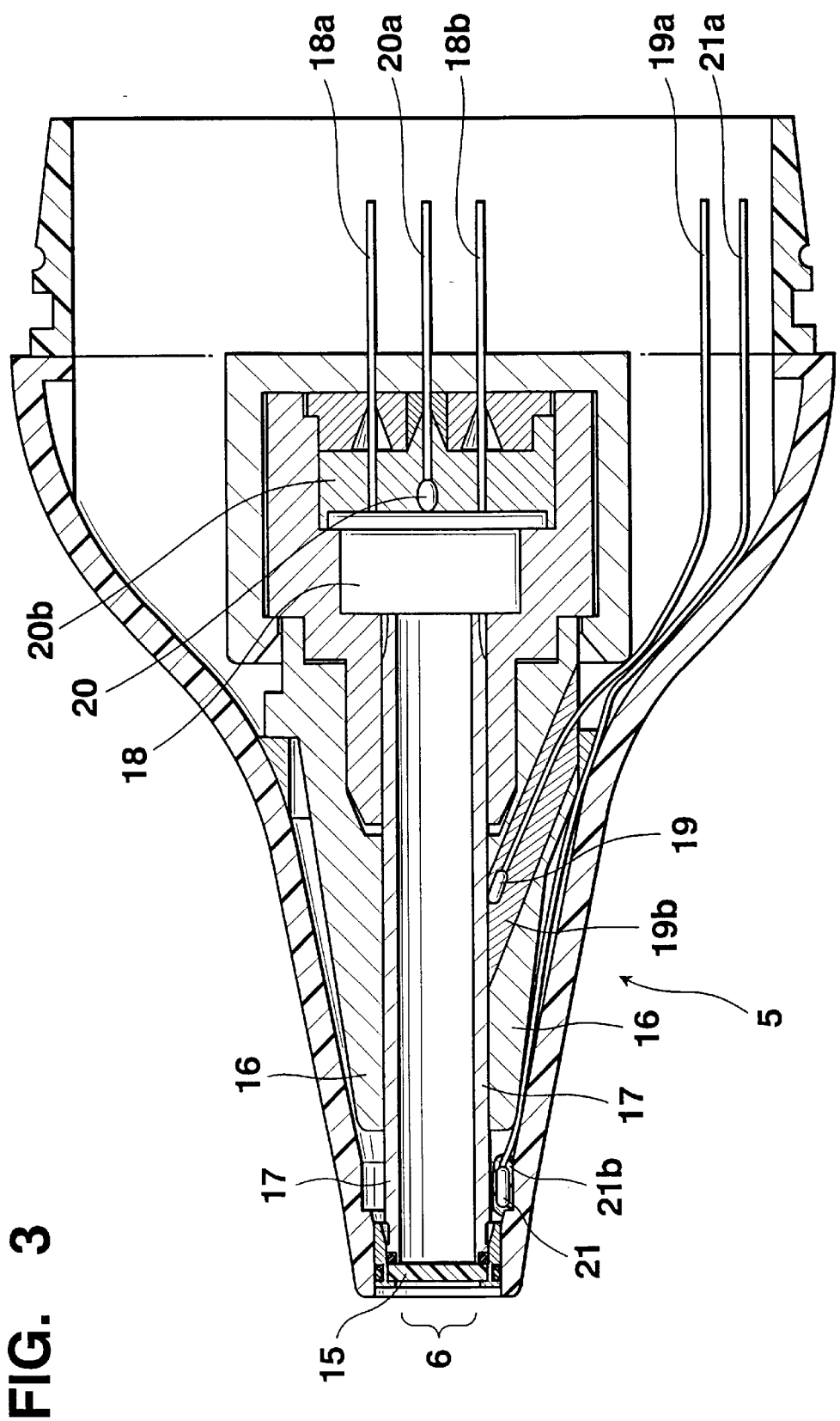
FIG. 3 is a cross-sectional view of a probe portion of the radiation thermometer shown in FIG. 1.

FIG. 3 is a cross-sectional view of the probe portion 5 of the radiation thermometer 1 shown in FIG. 1.

As shown in FIG. 3, a window member 15 is provided on the introduction opening 6 at the front end of the probe portion 5. This window member 15 is made of a material like an optical crystalline material which is capable of transmitting an infrared ray therethrough, such as, for example, calcium fluoride, silicon or barium fluoride.

An infrared ray that has come through the window member 15 is guided to reach an infrared ray sensor 18 by a light-guiding pipe 17 held by an aluminum block 16. A thermopile, for example, can be used as the infrared ray sensor 18. The light-guiding pipe 17 is made of a material, such as, for example, copper, brass or stainless steel.

In FIG. 3, 19 denotes a thermistor for detecting a temperature of the light-guiding pipe 17, and the thermistor 19 is fixed to a vicinity of the light-guiding pipe 17 by an adhesive 19b. 20 denotes a thermistor for detecting a temperature of the infrared ray sensor 18, and the thermistor 20 is fixed to a vicinity of the infrared ray sensor 18 by an adhesive 20b. 21 denotes a thermistor for detecting a temperature of the front end portion of the probe portion 5, and the thermistor 21 is fixed to the front end portion of the probe portion 5 by an adhesive 21b. For the thermistors 19, 20 and 21, other temperature-measuring means may be used such as, for example, a posistor or a diode.

In FIG. 3, 18a and 18b denote output terminals of the infrared ray sensor 18 respectively, 19a denotes an output terminal of the thermistor 19, 20a denotes an output terminal of the thermistor 20, and 21a denotes an output terminal of the thermistor 21.

Figure 4:
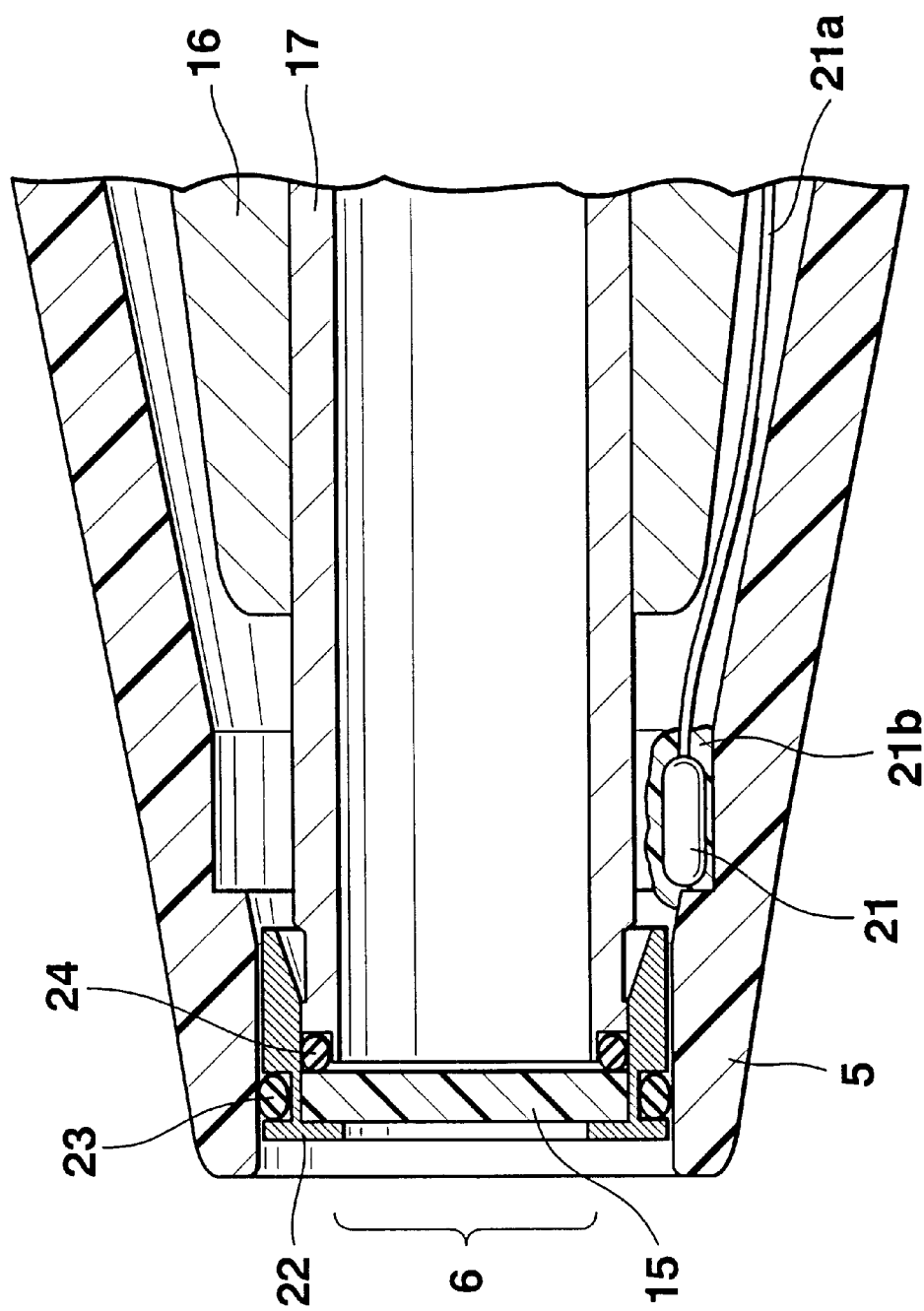
FIG. 4 is a cross-sectional view showing by enlargement a front end of the probe portion of the radiation thermometer shown in FIG. 3.

FIG. 4 is a cross-sectional view showing by enlargement the front end of the probe portion 5 of the radiation thermometer 1 shown in FIG. 3.

A gap between the probe portion 5 and a window holding member 22 is waterproofed and sealed by a first packing 23. A gap between the window holding member 22 and the light-guiding pipe 17 is waterproofed and sealed by a second packing 24.

The window holding member 22 is made of a material such as, for example, copper. The first packing 23 and the second packing 24 are made of a material of an elastic member, such as, for example, rubber.

The light-guiding pipe 17 and the window holding member 22 are of a cylindrical shape, for example. The window member 15 is of a disk-shape, and the first packing 23 and the second packing 24 are of a ring-rubber shape respectively.

According to the present embodiment, the light-guiding pipe 17 and the window member 15 are connected by the second packing 24 and the window holding member 22 to waterproof the inner surface of the light-guiding pipe 17.

In the present embodiment with the above-described structure, in order to make it possible to disinfect and clean the waterproof structure with an alcohol or a detergent, it is necessary to use the window member 15 having a certain thickness to have such strength that the window member 15 is not broken by the cleaning. Such a member has a certain level of thermal conductivity depending on the thickness. Therefore, when the front end of the probe portion 5 is inserted into the external acoustic opening 11 for measuring a body temperature, this member will not immediately have the same temperature as that of the external acoustic opening 11.

In the above-described environment, in order to take advantage of being able to measure a body temperature during a short period of time, which is one of the features of the radiation thermometers, it is necessary to calculate a body temperature in such a state that the window member 15 is emitting an infrared ray at a temperature different from the temperature of the external acoustic opening 11. Therefore, the infrared ray emitted from the window member 15 cannot be disregarded in calculating the body temperature.

Considering the above from a different viewpoint, in order to calculate a body temperature by always taking into account the existence of an infrared ray emitted from the window member 15, it is preferable that the temperature of the window member 15 does not change during measurement time.

In other words, it is preferable that the window member 15 is made of a material that has a certain level of strength and that has a certain level of thermal capacity. Further, considering a processing precision of a material that forms the window member 15, it is preferable that the window member 15 is formed into a disk having a thickness of at least 0.3 mm.

For information, specific heat (heat quantity (cal) that is required to increase the temperature of a substance of 1 gram by 1° C.) (cal/g° C.) of each of calcium fluoride, silicon and barium fluoride that are optical crystalline materials having an infrared ray permeability is 0.211 cal/g° C., 0.1383 cal/g° C., and 0.098 cal/g° C., respectively.

Figure 5:
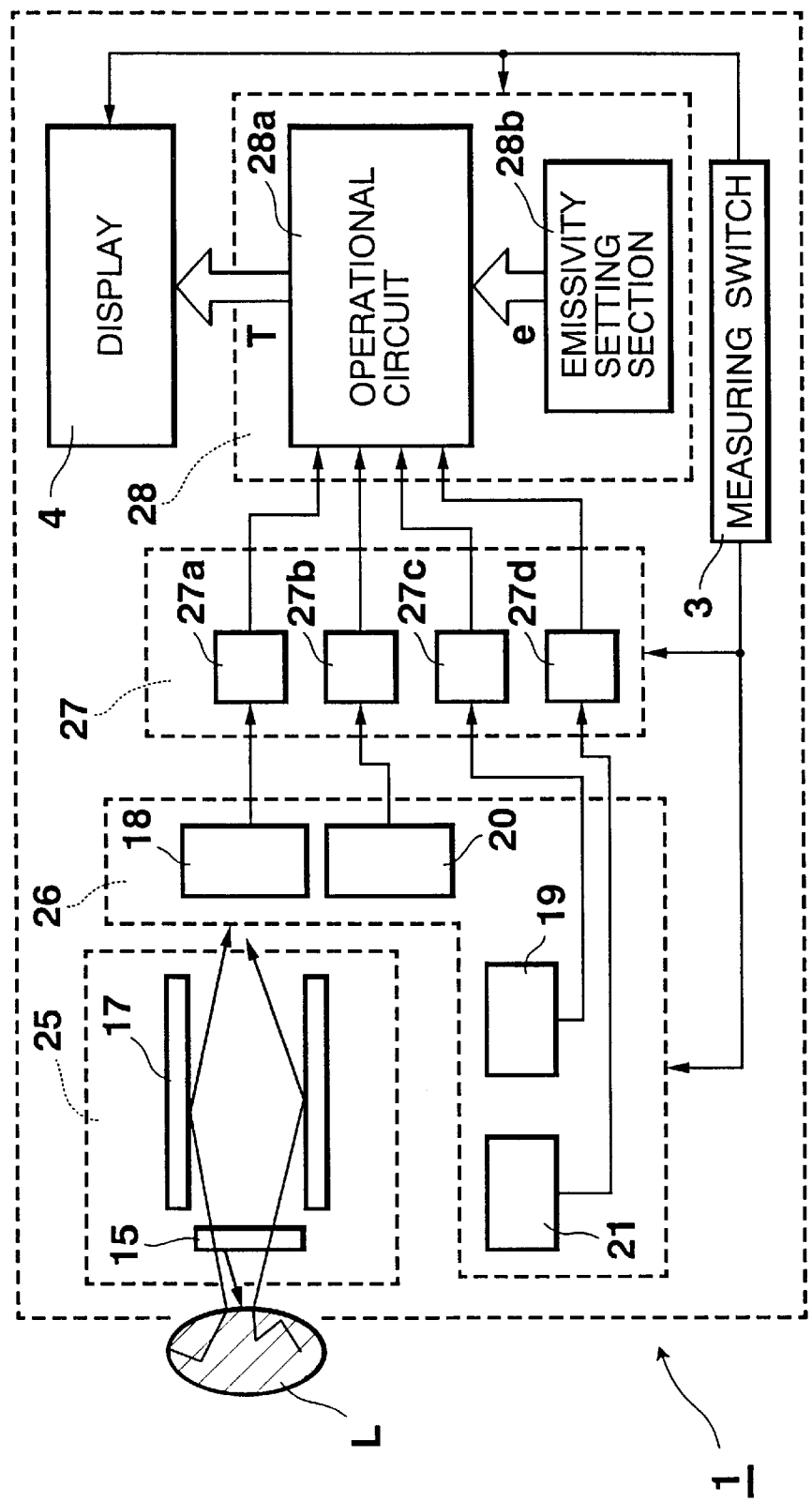
FIG. 5 is a block diagram of the radiation thermometer shown in FIG. 1.

FIG. 5 is a block diagram of the radiation thermometer 1 shown in FIG. 1.

As shown in FIG. 5, the radiation thermometer 1 includes an optical system 25, a detector 26, an amplifier 27, a calculator 28, a display 4, and a measuring switch 3.

The optical system 25 comprises a light-guiding pipe 17 for efficiently collecting infrared rays from a temperature-measured object L, and a window member 15 having an infrared ray permeability.

The detector 26 comprises an infrared ray sensor 18, a thermistor 20 for detecting a temperature of the infrared ray sensor 18, a thermistor 19 for detecting a temperature of the light-guiding pipe 17, and a thermistor 21 for detecting a temperature of the front end of the probe portion 5. The thermistor 21 is positioned in the vicinity of the window member 15, and is therefore capable of measuring almost the same temperature as that of the window member 15.

The amplifier 27 comprises an amplifier 27a for amplifying an output voltage of the infrared ray sensor 18 as well as for digitizing the output voltage, an amplifier 27b for amplifying an output voltage of the thermistor 20 as well as for digitizing the output voltage, an amplifier 27c for amplifying an output voltage of the thermistor 19 as well as for digitizing the output voltage, and an amplifier 27d for amplifying an output voltage of the thermistor 21 as well as for digitizing the output voltage.

The calculator 28 comprises an operational circuit 28a and an emissivity setting section 28b. The operational circuit 28a carries out an operation (described later) based on signals from the infrared ray sensor 18, the thermistor 20, the thermistor 19 and the thermistor 21 respectively and an emissivity e from the emissivity setting section 28b. The operational circuit 28a then calculates a temperature of the temperature-measured object L, that is, the eardrum 12 and the external acoustic opening 11, and displays the calculated temperature on the display 4. The emissivity setting section 28b stores the emissivity e of the eardrum 12 and the external acoustic opening 11 described later, and outputs this emissivity e to the operational circuit 28a according to the operation of the measuring switch 3.

The measuring switch 3 outputs an operation signal for causing the detector 26, the amplifier 27, the calculator 28 and the display 4 to operate.

In the present embodiment, a temperature measured by the radiation thermometer 1 is displayed on the display 4. However, the present invention is not limited to such display. Alternatively, a plurality of body temperatures may be displayed in a form of bar charts or broken-line graphs, or a body temperature may be informed to a user through voice or the like. Thus, it is possible to use various informing means.

A process for calculating a temperature of a temperature-measured object by the operational circuit 28a will be explained next.

In general, an infrared ray sensor receives an infrared ray of an intensity corresponding to a temperature after subtracting a temperature of the infrared ray sensor itself from a temperature of an object under measurement. Accordingly, it is necessary that the operational circuit 28a adds a temperature of the infrared ray sensor 18 itself detected by the thermistor 20, to a temperature corresponding to an intensity of an infrared ray detected by the infrared ray sensor 18.

When a temperature of the optical system 25 such as the window member 15 and the light-guiding pipe 17 is different from a temperature of the infrared ray sensor 18 (for example, when the probe portion 5 is inserted into the external acoustic opening 11, the temperature of the optical system 25 increases, although not to the same temperature as that of the external acoustic opening 11, and a slight temperature difference arises between the temperature of the optical system 25 and the infrared ray sensor 18), the infrared rays detected by the infrared ray sensor 18 include the infrared ray emitted from the optical system 25 itself in addition to the infrared ray from the temperature-measured object L under measurement.

Therefore, the thermistor 19 detects a temperature of the optical system 25, and the operational circuit 28a adds the temperature detected by the thermistor 20 to the temperature corresponding to the intensity of the infrared ray detected by the infrared ray sensor 18 and subtracts the temperature detected by the thermistor 19. Thus a temperature of the object L under measurement can be obtained.

In the above-described process, there has not yet been taken into account an infrared ray that has been emitted from the front end of the probe portion 5 of the radiation thermometer 1, then reflected from the eardrum 12 or the external acoustic opening 11 and that has finally been incident to the infrared ray sensor 18. A process that takes into account the above point will be explained next.

In general, for measuring a temperature of an object with a radiation thermometer, it is necessary to set an emissivity of the object under measurement. According to the conventional radiation thermometer, as disclosed in Japanese Laid-open Patent Publication No. 28524/1990, a body temperature has been calculated based on the emissivity 1.00 by assuming the eardrum or the external acoustic opening to be measured as a black body.

In the present embodiment, in order to take into account an infrared ray that has been emitted from the front end of the probe portion 5 of the radiation thermometer 1, then reflected from the eardrum 12 or the external acoustic opening 11 and that has finally been incident to the infrared ray sensor 18, a value of less than 1.00 is employed as the emissivity e of the eardrum 12 and the external acoustic opening 11 that are the temperature-measured object.

As one detailed example of the emissivity e of the eardrum 12 and the external acoustic opening 11 as the temperature-measured object, it is recommendable to use 0.90 to 0.98. This value has been obtained from actual measurement of emissivity based on many persons. In this actual measurement, the distribution of the emissivity is such that a majority of the persons who are subjected to measurement have emissivity near 0.94, with a gradually smaller number of persons having emissivity toward 0.90 and toward 0.98. Therefore, when the emissivity $\underline{e}$ is used as a fixed value, it is recommendable to use 0.94.

It is known that, in an radiation thermometer, an output voltage $V_b$ of an infrared ray sensor for measuring an infrared ray from a temperature-measured object is given by expression (1).

$$V_b = K\{(1-e)T_p^4 + e\ T_b^4 - T_o^4\} \quad (1)$$

where K represents a constant, $\underline{e}$ represents an emissivity of an object under measurement, $T_p$ represents a temperature of a probe, $T_b$ represents a temperature of an object under measurement, and $T_o$ represents a temperature of an infrared ray sensor. However, in order to simplify the explanation, an influence of a temperature of the optical system that is detected by a thermistor is omitted from the above expression.

The expression (1) can be modified into the expression (2).

$$T_b = \{[V_b/K + T_o^4 - (1-e)T_p^4]/e\}^{1/4} \quad (2)$$

In the present embodiment, it is possible to use an output voltage of the thermistor 21 as the temperature $T_p$ of the probe, to use an output voltage of the thermistor 20 as the temperature $T_o$ of the infrared ray sensor, and to use an output voltage of the infrared ray sensor 18 as the output voltage $V_b$ of the infrared ray sensor.

Therefore, the operational circuit 28a shown in FIG. 5 carries out the operation given by the expression (2) to calculate a temperature of the object L under measurement, that is, the eardrum 12 and the external acoustic opening 11, and displays the calculated temperature on the display 4.

As is clear from the expression (2), in the process that takes into account an infrared ray that has been emitted from the front end of the probe portion 5 of the radiation thermometer 1, then reflected from the eardrum 12 or the external acoustic opening 11 and that has finally been incident to the infrared ray sensor 18, the output $V_b$ of the infrared ray sensor is divided by the emissivity $\underline{e}$ of the object under measurement. For the object under measurement of which emissivity is less than 1.00, an emitted volume of infrared rays becomes smaller according to the emissivity than that of an object under measurement of which emissivity is 1.00, even if both objects under measurement have the same temperatures. Based on this process, that is, based on $V_b/\underline{e}$, it is possible to obtain a value corresponding to an output of the infrared ray sensor obtained when the emissivity of the object under measurement is 1.00, which is necessary for obtaining the temperature of the object under measurement.

Particularly, in the radiation thermometer according to the embodiment in which measurement starts measuring before a probe is inserted into the external acoustic opening and a peak value is obtained either during a process of inserting the probe into the external acoustic opening or immediately after the probe has been inserted into the external acoustic opening, the front end of the probe is kept at almost the environmental temperature and thus the temperature of the front end of the probe is lower than the temperature of the external acoustic opening or the eardrum. Since the infrared ray emitted from the front end of the probe has a large influence in generating an error, it is very advantageous to obtain a body temperature by setting the emissivity as in the present invention.

Further, in a radiation thermometer wherein measuring starts after a probe has been inserted into the external acoustic opening, the temperature of the front end of the probe approaches that of the external acoustic opening before the measurement is started after the probe has been inserted into the external acoustic opening. However, as the radiation thermometer takes only a few seconds for measuring a body temperature, the temperature of the front end of the probe does not become the same as the temperature of the external acoustic opening. Therefore, it is advantageous to obtain a body temperature by setting the emissivity as in the present invention.

Further, in a radiation thermometer of the type with a probe cover mounted on the front end of the probe that has a small thermal capacity and can more easily follow a temperature change than the front end of the probe, the probe cover can follow the temperature of the external acoustic opening. However, as the radiation thermometer takes only a few seconds for measuring a body temperature, the temperature of the probe cover will not become the same as the temperature of the external acoustic opening. Therefore, it is advantageous to obtain a body temperature by setting the emissivity as in the present invention.

Further, as described in JIS1612-1988, a radiation thermometer of general type is subjected to examination using a black body of which emissivity is set to substantially 1.00. Similarly, the radiation thermometer is also subjected to examination using a black body of which emissivity is set to substantially 1.00. Such examination is carried out not only during a manufacturing process but also at the time of a shipment of a finished product. The radiation thermometer of the present embodiment is structured such that the emissivity to be used for the calculation can be set to 1.00 by a predetermined operation. This radiation thermometer can also be subjected to examination with a black body of which emissivity has been set to 1.00. This predetermined operation is carried out by using the measuring switch 3. However, rather than simple depression of the measuring switch 3 as described above, it is necessary to carry out the operation in a predetermined pattern.

The predetermined operation will be explained next with reference to FIG. 6.

FIG. 6 shows patterns of an operation signal generated by operation of the measuring switch of the radiation thermometer shown in FIG. 1. In FIG. 6, (a) shows a predetermined pattern of an operation signal, and (b) shows a detailed example of a pattern of the operation signal.

The following operation is carried out to set an emissivity to 1.00 by way of example. First, the measuring switch 3 is depressed in a predetermined pattern as shown in FIG. 6(a).

Figure 6A:
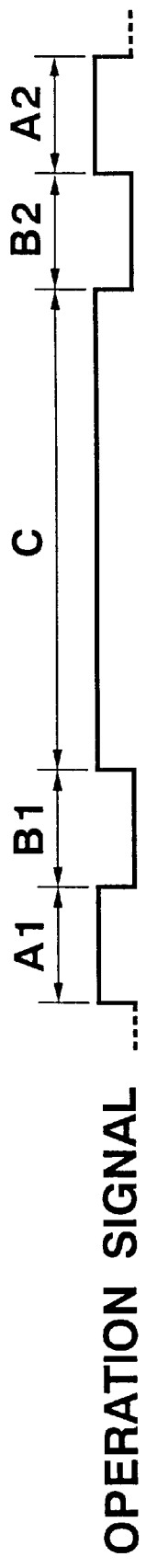
FIG. 6 shows patterns of an operation signal generated by operating a measuring switch of the radiation thermometer shown in FIG. 1 wherein (a) shows a predetermined pattern of an operation signal, and (b) shows a detailed example of a pattern of the operation signal.

In FIG. 6(a), first signals A1 and A2 are operation signals whose duration ranges from 105 msec to 255 msec (a first range of time). A second signal C is an operation signal whose duration ranges from 525 msec to 975 msec (a second range of time), which is longer than the duration of the first signals A1 and A2. B1 and B2 are an interval between the first signal A1 and the second signal C and an interval between the second signal C and the first signal A2, respectively, that range from 105 msec to 255 msec.

In order to generate the above operation signals, the measuring switch 3 is kept depressed during 105 msec to 255 msec. Then, the measuring switch 3 is kept undepressed during 105 msec to 255 msec. Then, again the measuring switch 3 is kept depressed for 525 msec to 975 msec. Then, again the measuring switch 3 is kept undepressed for 105 msec to 255 msec. Thereafter, the measuring switch 3 is kept depressed for 105 msec to 255 msec.

Figure 6B:
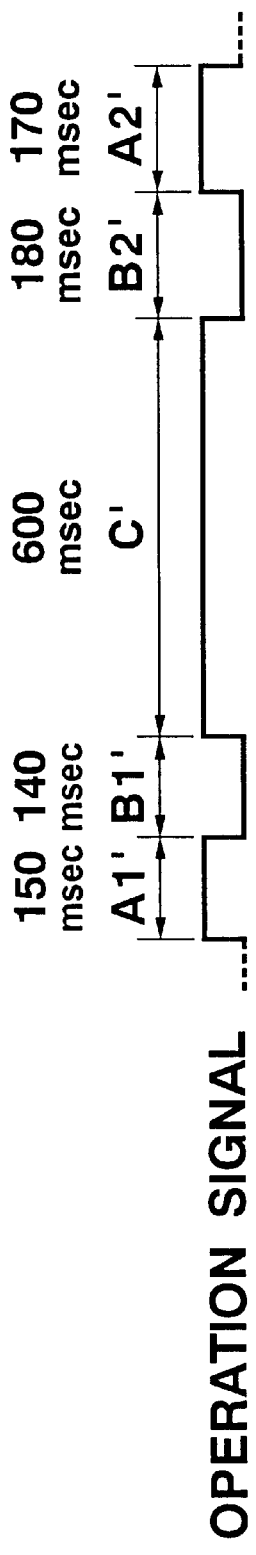

FIG. 6(b) shows an example of a generation pattern of an operation signal. First, a signal A1' is generated for a period of time of 150 msec. Next, an interval B1' is made for 140 msec. Then, a signal C' is generated for a period of time of 600 msec. Next, an interval B2' is made for 180 msec. Then, a signal A2' is generated for 170 msec. A pattern of A1, C and A2 as shown in FIG. 6(a) should not be generated unless a general user intends to generate this pattern intentionally. It is intended that such examination pattern can never occur in error other than for examination in the manufacturing process.

Upon generation of the operation signals as shown in FIG. 6(a), the emissivity setting section 28b shown in FIG. 5 detects these signals and outputs a value of emissivity 1.00 to the operational circuit 28a, and at the same time, automatically a body temperature measuring operation starts. Then, the measurement is carried out by directing the introduction opening 6 toward the black body. Upon completion of the measurement under a predetermined condition, a maximum value of temperatures measured from start of the measurement to the end of the measurement is displayed as a temperature of the object under measurement. In other words, a temperature of the black body that is an object under measurement is measured and displayed on the display 4.

When a normal temperature measuring operation is carried out in this state, the temperature measuring operation is carried out at a value of the emissivity that has been set prior to the measurement of the black body. As a result, in the above predetermined operation pattern, the measuring operation is carried out with the emissivity set at 1.00.

Figure 7:
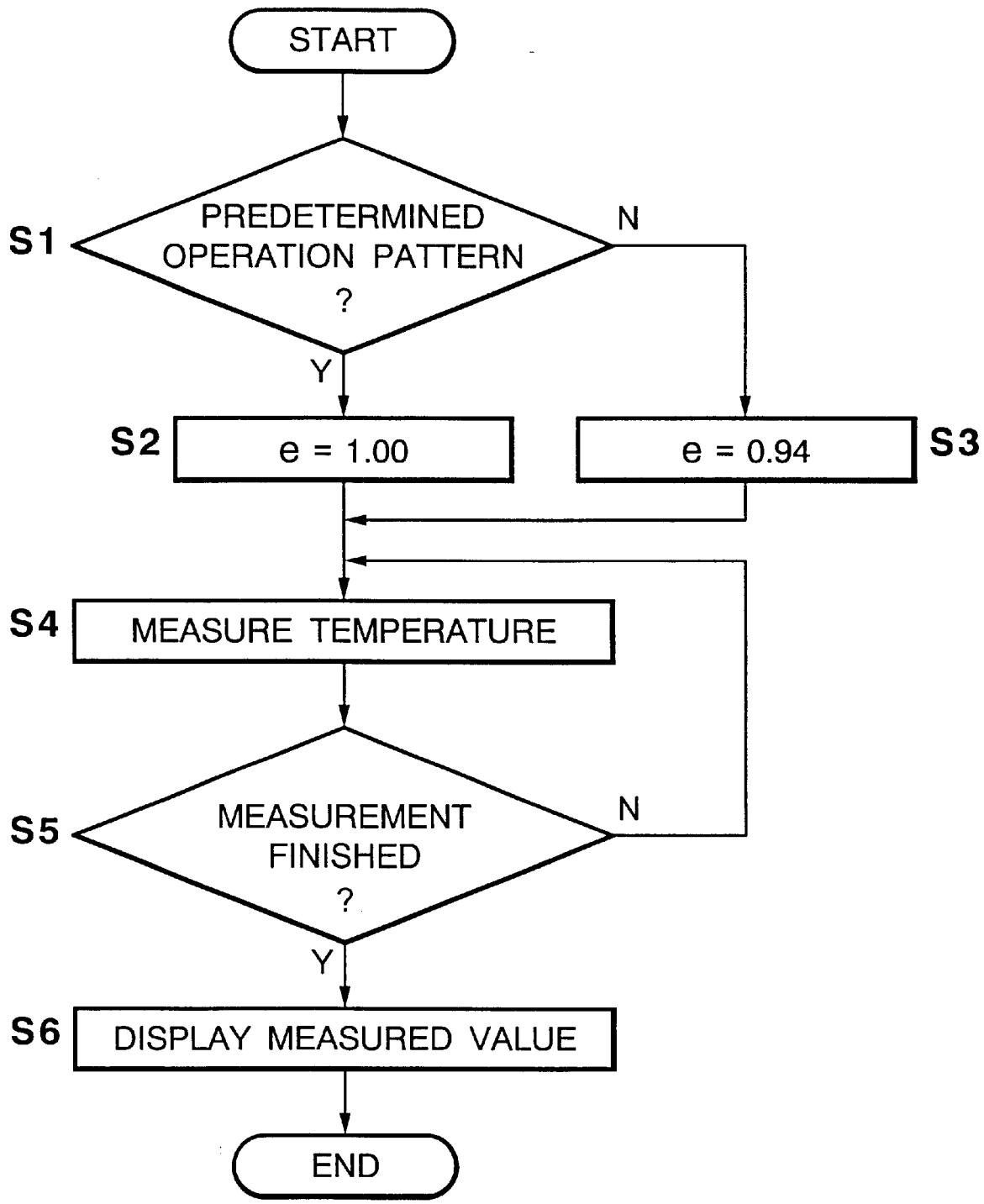
FIG. 7 is a flowchart showing a body temperature measuring operation of the radiation thermometer shown in FIG. 1.

FIG. 7 is a flowchart showing a body temperature measuring operation of the radiation thermometer 1 shown in FIG. 1.

A body temperature measuring operation of the radiation thermometer 1 will be explained next by reference to the block diagram shown in FIG. 5 and the flowchart shown in FIG. 7. In FIG. 7, symbols S1 to S6 denote steps of processing.

First, when the measuring switch 3 is depressed, the process proceeds to step S1. At step S1, the emissivity setting section 28b detects the operation pattern of the measuring switch 3 and determines whether the operation pattern as detected is the above-described predetermined pattern or not. If the emissivity setting section 28b has determined at step S1 that the operation pattern as detected is the predetermined pattern, then the emissivity setting section 28b sets the emissivity to 1.00 at step S2. On the other hand, if the emissivity setting section 28b has determined at step S1 that the operation pattern is not the predetermined pattern, then the emissivity setting section 28b sets the emissivity to 0.94 at step S3. Thus, the emissivity setting section 28b operates as an emissivity selecting means that selects the emissivity of a hole portion of a living being when the emissivity is less than 1 or the emissivity of the object under measurement is 1.00.

At step S4, the operational circuit 28 measures a temperature of the object L under measurement by using an output of the amplifier 27 and the emissivity set at steps S2 and S3. Then, at step S5, the operational circuit 28a determines based on a predetermined condition whether the measurement has been finished or not. Specifically, if it has been determined based on the predetermined condition that a peak temperature has been obtained, then the measuring is finished, and the process proceeds to step S6. On the other hand, if it has been determined that a peak value has not yet been obtained, then the process returns to step S4 of a temperature measurement.

At step S6, the display 4 displays during a predetermined period of time the measured peak value as a temperature of the object L under measurement, and the measuring operation is finished.

A second embodiment of the present invention will be explained next.

Figure 8:
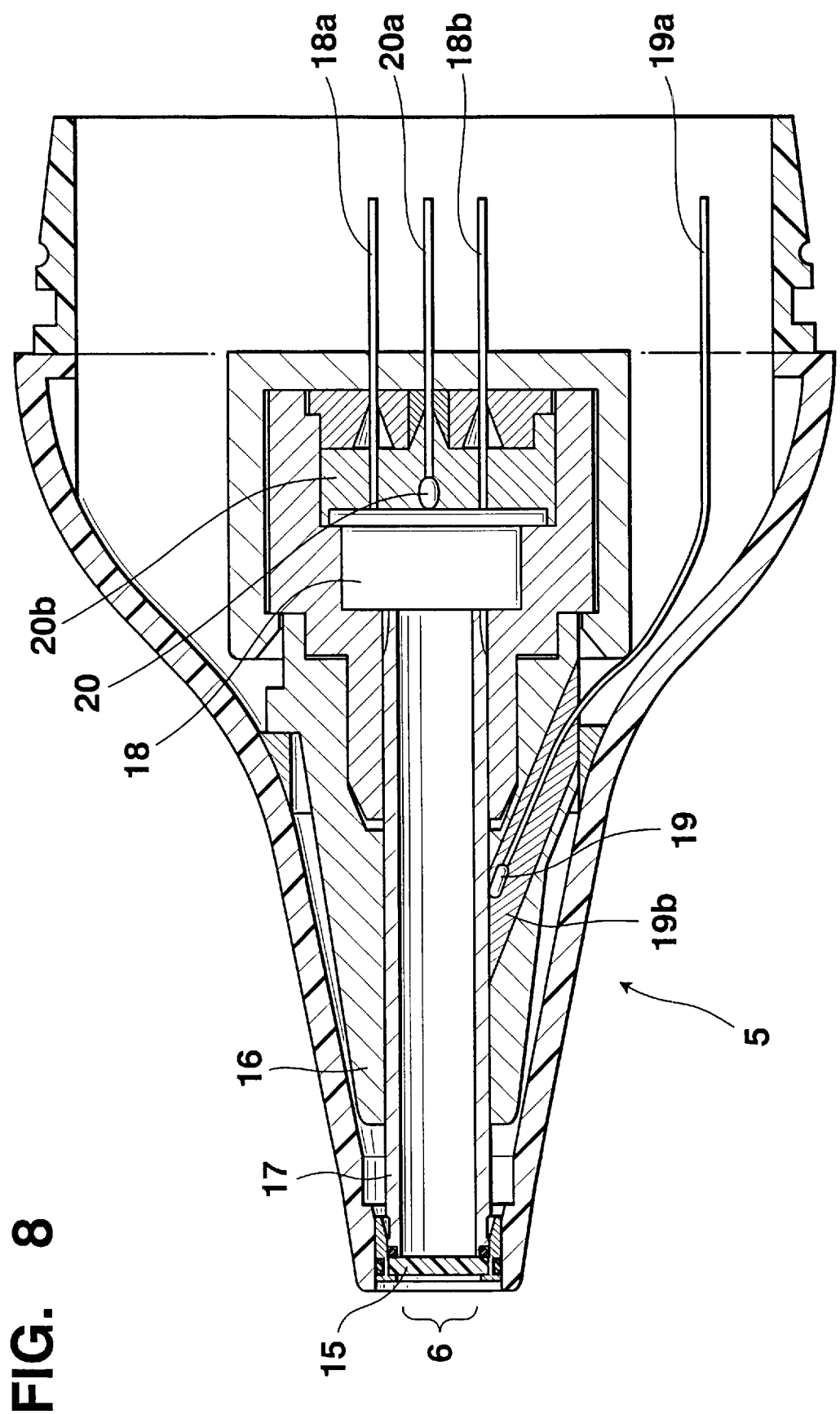
FIG. 8 is a cross-sectional view of a probe portion of a radiation thermometer according to a second embodiment of the present invention.

FIG. 8 is a cross-sectional view of a probe portion 5 of a radiation thermometer according to a second embodiment of the present invention.

A difference from the embodiment shown in FIG. 3 is that there is no thermistor 21.

A difference between a temperature of an infrared ray sensor 18 and a temperature of the front end of a probe portion 5 is smaller than a difference between a temperature of an eardrum 12 or an external acoustic opening 11 as an object under measurement and a temperature of the front end of the probe portion 5. Therefore, in order to simplify the structure, the thermistor 21 shown in FIG. 3 can be substituted with the thermistor 20.

In this case, $T_0$ can be set to $T_p$ in the expression 2. The operation to be carried out by the operational circuit 28a is given by expression 3.

$$T_b = (T_0^4 + V_b/Ke)^{1/4} \tag{3}$$

In the present embodiment, an output voltage of the thermistor 20 can be used as the temperature $T_0$ of the infrared ray sensor, and an output voltage of the infrared ray sensor 18 can be used as the output voltage $V_b$ of the infrared ray sensor.

Accordingly, the operational circuit 28a carries out the operation shown in the expression 3 to calculate a temperature of the object L under measurement, that is, the eardrum 12 and the external acoustic opening 11, and displays the calculated temperature on the display 4.

As is clear from the expression (3), in the present embodiment too, in the process that takes into account an infrared ray that has been emitted from the front end of the probe portion 5 of the radiation thermometer 1, then reflected from the eardrum 12 or the external acoustic opening 11 and that has finally been incident to the infrared ray sensor 18, the output $V_b$ of the infrared ray sensor is divided by the emissivity e of the object under measurement.

A third embodiment of the present invention will be explained next.

In the third embodiment, it is an object to simplify the structure and to increase the processing speed by approximating the numerical expression given in the expression (3) in terms of a more simple expression.

Figure 9:
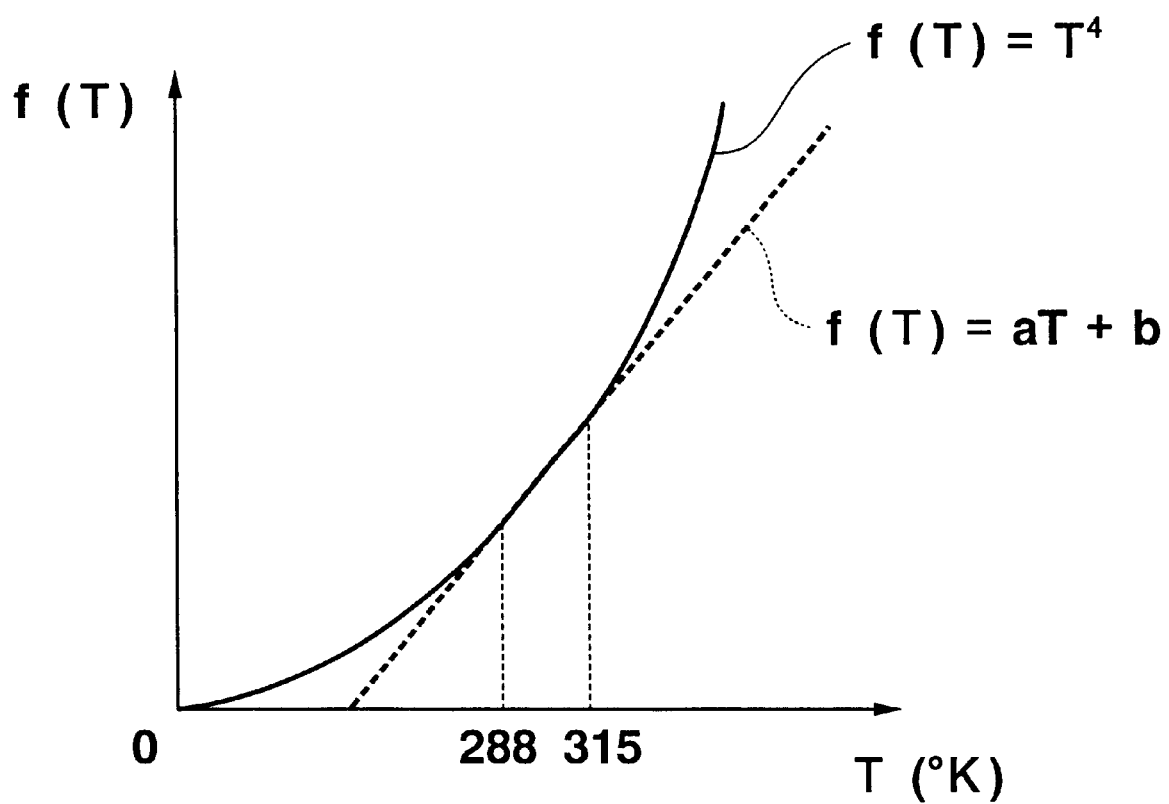
FIG. 9 shows a curve of a function f (T)=$T^4$ in a graph.

When the function f (T)=$T^4$ is depicted into a graph in respect to T as an absolute temperature, a curve as shown in FIG. 9 is obtained. In FIG. 9, a horizontal axis represents T and a vertical axis represents f (T).

In the curve shown in FIG. 9, when the radiation thermometer 1 is actually used at an environmental temperature (that is, when a range of the temperature $T_0$ of the infrared ray sensor 18 is observed), a narrow range of about 288° K (15° C.) to 308° K (35° C.) will be noted, assuming that the radiation thermometer 1 is usually used indoors. Further, a temperature range of the eardrum 12 or the external acoustic opening 11 that is the object under measurement is about 308° K (35° C.) to 315° K (42° C.). Within these ranges, the function f (T)=$T^4$ can be approximated by a linear expression f (T)≈aT+b.

In other words, the function can be approximated by $T_0^4 \approx aT_0+b$ and $T_b^4 \approx aT_b+b$.

The expression (3) can be modified as the expression (4).

$$T_b^4 = T_0^4 + V_b/Ke \quad (4)$$

By substituting the above result of approximation $T_0^4 \approx aT_0+b$ and $T_b^4 \approx aT_b+b$ into the expression (4), expression (5) is obtained.

$$(aT_b+b) = (aT_0+b) + V_b/Ke \quad (5)$$

The expression (5) can be further modified into expression (6).

$$T_b = T_0 + V_b/aKe \quad (6)$$

When aK is replaced by $K_1$, expression (7) is obtained.

$$T_b = T_0 + V_b/K_1 e \quad (7)$$

In the present embodiment, an output voltage of the thermistor 20 can be used for the temperature $T_0$ of the infrared ray sensor in the expression (7), and an output voltage of the infrared ray sensor 18 can be used for the output voltage $V_b$ of the infrared ray sensor.

Accordingly, the operational circuit 28a carries out the operation shown in the expression (7) to calculate a temperature of the object L under measurement, that is, the eardrum 12 and the external acoustic opening 11, and displays the calculated temperature on the display 4.

As is clear from the expression (7), in the present embodiment too, in the process that takes into account an infrared ray that has been emitted from the front end of the probe portion 5 of the radiation thermometer 1, then reflected from the eardrum 12 or the external acoustic opening 11 and that has finally been incident to the infrared ray sensor 18, the output $V_b$ of the infrared ray sensor is divided by the emissivity e of the object under measurement.

A fourth embodiment of the present invention will be explained next.

Figure 10:
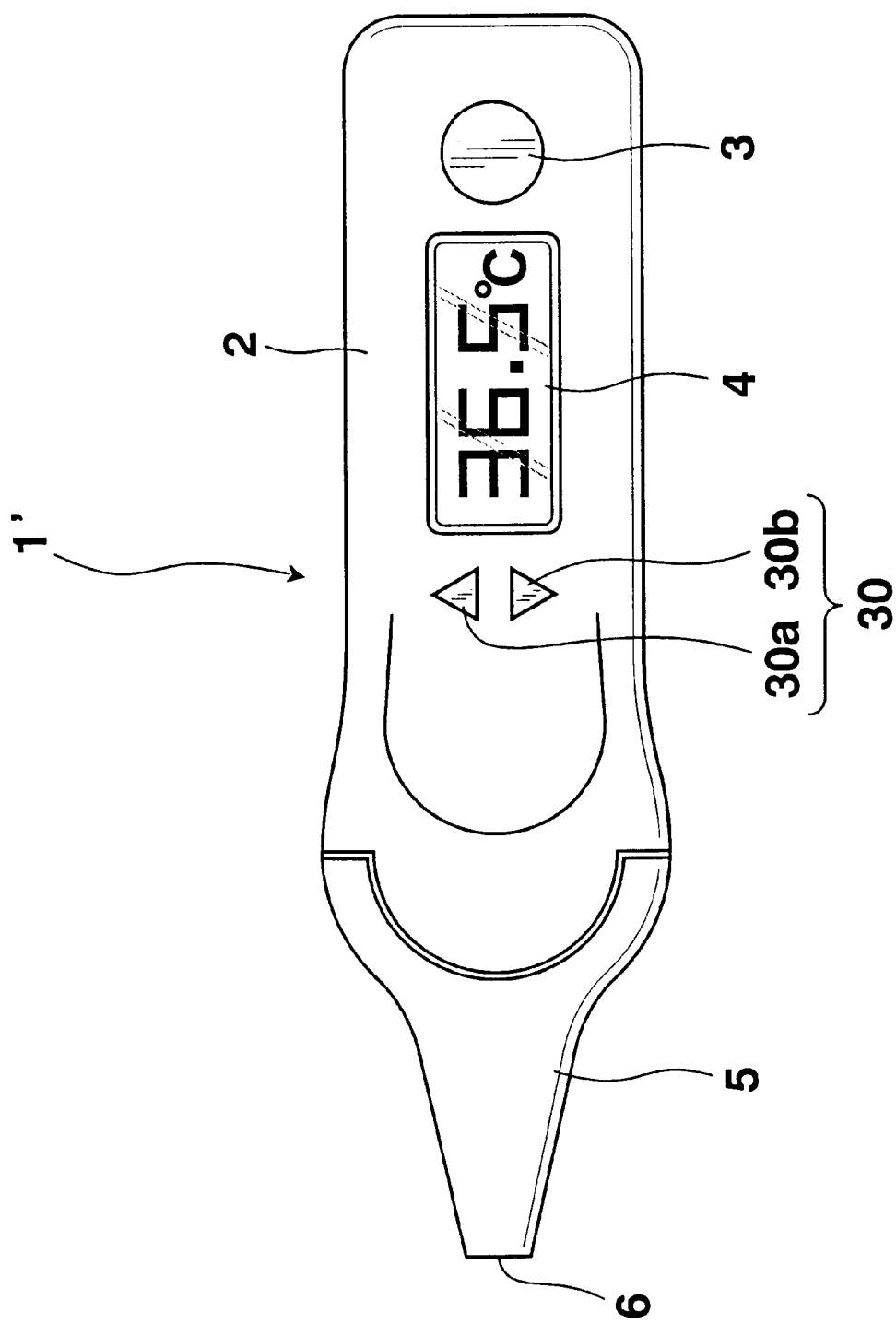
FIG. 10 is a schematic view of a fourth embodiment of a radiation thermometer according to the present invention.

FIG. 10 is a schematic view of a fourth embodiment of a radiation thermometer according to the present invention.

As shown in FIG. 10, an emissivity setting switch 30 consisting of an UP switch 30a and a DOWN switch 30b is further provided on the upper part of case means 2 of an radiation thermometer 1'.

As described above, the emissivity e of the eardrum 12 and the external acoustic opening 11 is different to some extent depending on a person. In the present embodiment, an emissivity setting switch 30 is provided to enable a user to change the emissivity e. With this arrangement, it becomes possible to measure a body temperature more accurately.

A detailed operation of setting the emissivity is as follows. When the UP switch 30a is depressed once during a period other than a measuring operation, the emissivity e is displayed with an addition of +0.01. When the DOWN switch 30b is depressed once, the emissivity e is displayed with a subtraction. When the measuring switch 3 is depressed after a desired emissivity has been displayed, a radiation thermometer 1' starts a body temperature measuring operation based on a value of the emissivity that has been displayed before the measuring switch 3 is depressed.

Figure 11:
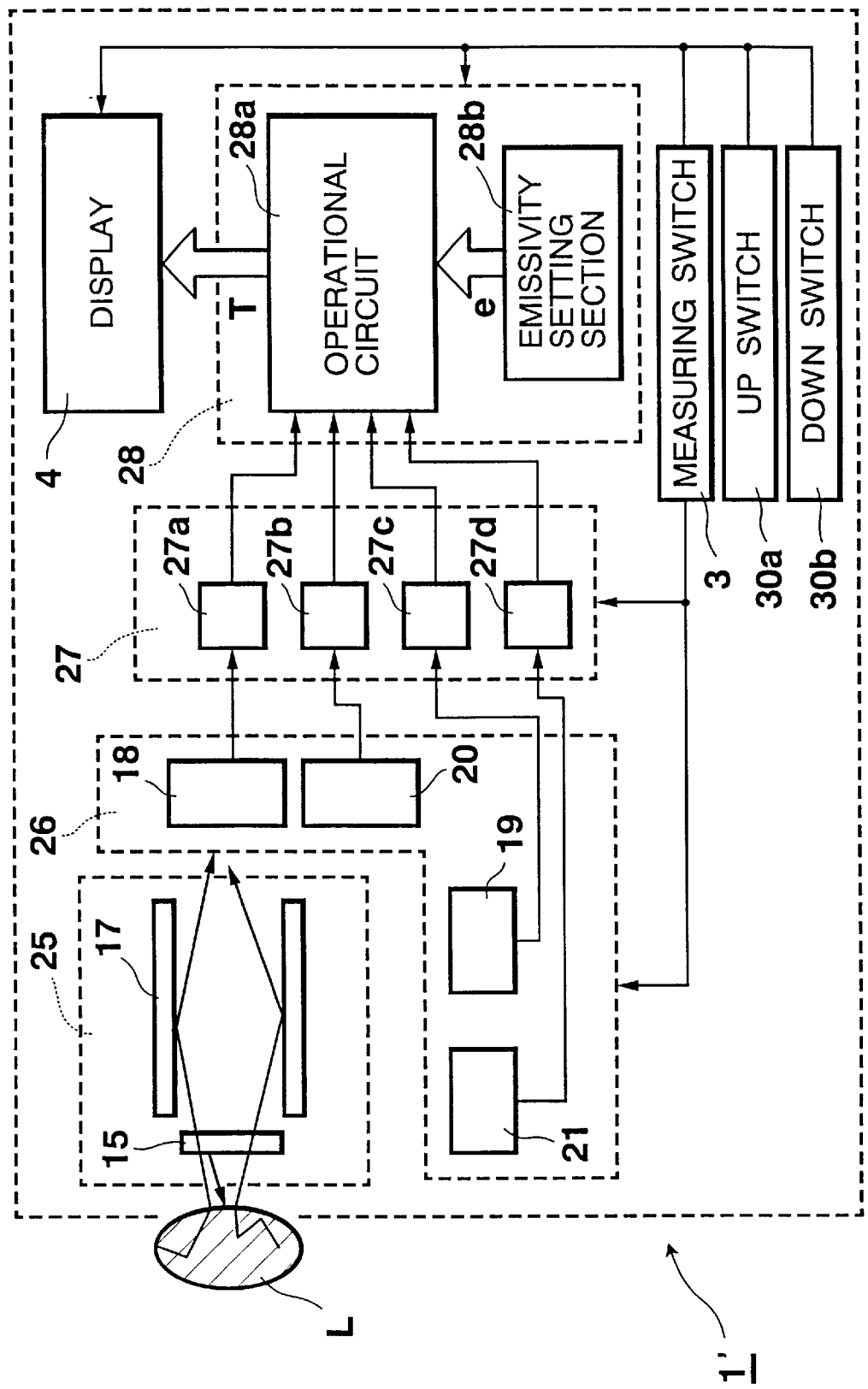
FIG. 11 is a block diagram of the radiation thermometer shown in FIG. 10.

FIG. 11 is a block diagram of the radiation thermometer 1' shown in FIG. 10.

The block diagram of the radiation thermometer 1' will be explained with reference to FIG. 11. Constituent elements identical with those in the block diagram of the radiation thermometer 1 shown in FIG. 5 are attached with like numbers, and their explanation will be omitted. The block diagram of FIG. 11 is different from the block diagram of FIG. 5 only in an operation switch. The operation switch comprises a measuring switch 3, the UP switch 30a and the DOWN switch 30b.

A signal that is generated when the UP switch 30a or the DOWN switch 30b has been depressed is output to a calculator 28 and a display 4. An emissivity setting section 28b of the calculator 28 sets an emissivity e based on the operation of these switches, and the display 4 displays the set value of the emissivity.

A signal that is generated when the measuring switch 3 has been depressed is output to a detector 26, an amplifier 27, the calculator 28 and the display 4, in a similar manner to that of the first embodiment.

Figure 12:
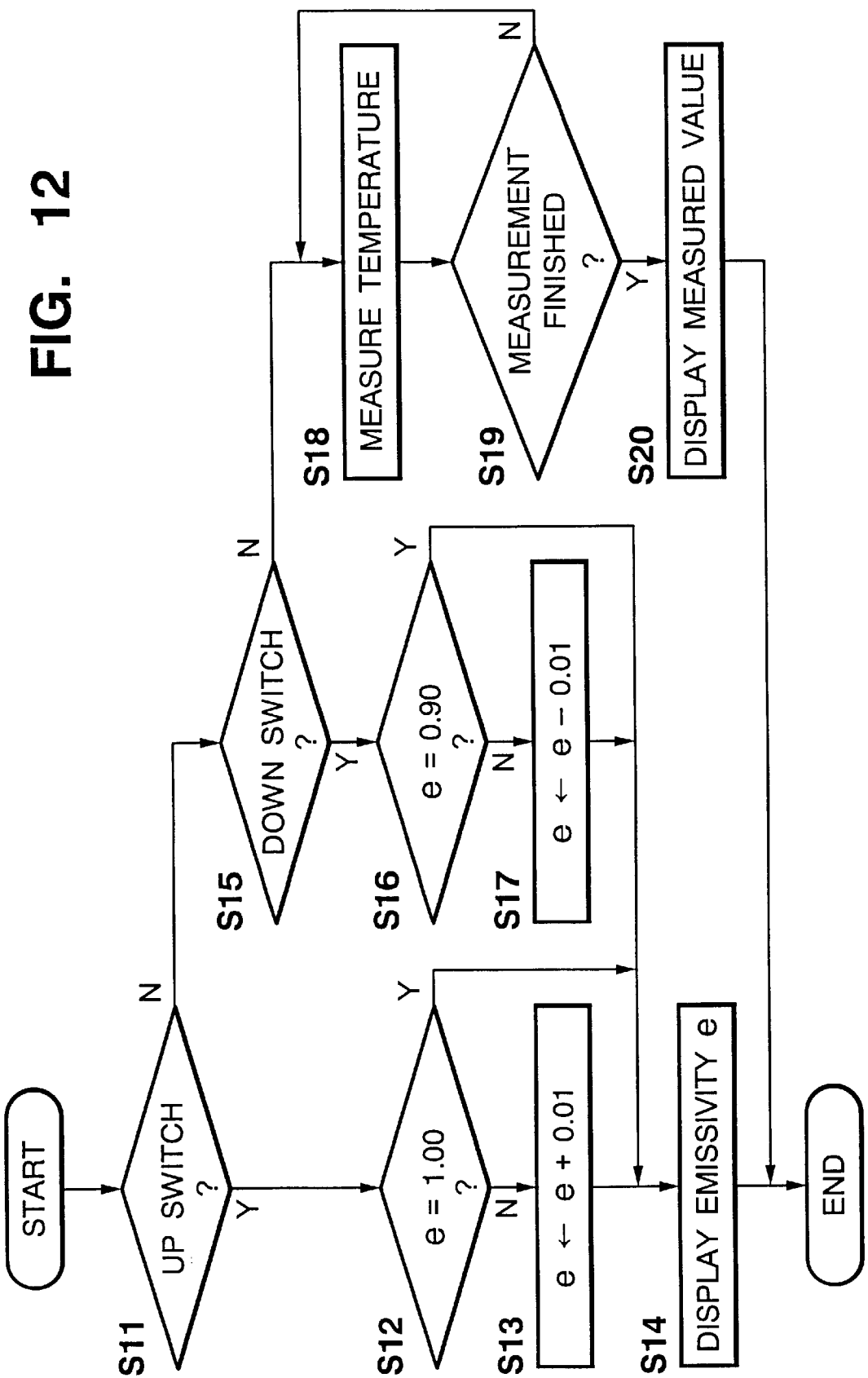
FIG. 12 is a flowchart showing a body temperature measuring operation of the radiation thermometer shown in FIG. 10.

FIG. 12 is a flowchart showing a body temperature measuring operation of the radiation thermometer 1' shown in FIG. 10.

An emissivity setting operation and a body temperature measuring operation of the radiation thermometer 1' will be explained with reference to the block diagram shown in FIG. 11 and the flowchart shown in FIG. 12. In FIG. 12, symbols of S11 to S20 denote steps of each processing.

First, at step S11, when any one of the measuring switch 3, the UP switch 30a and the DOWN switch 30b has been depressed, the process proceeds to step S11. At step S11, the emissivity setting section determines whether the depressed switch is the UP switch 30a or not. When it is determined that the depressed switch is the UP switch 30a, the process proceeds to step S12. When it is determined that the depressed switch is not the UP switch 30a, the process proceeds to step S15. At step S12, the emissivity setting section 28b determines whether the emissivity is 1.00 or not. When it has been determined at step S12 that the emissivity is not 1.00, the existing emissivity e is added by 0.01. At step S14, the display 4 displays this value for a predetermined period of time. Then the emissivity setting operation is finished. When it has been determined at step S12 that the emissivity is 1.00, this value 1.00 is displayed as the value of the emissivity e for a predetermined period of time at step S14. Then, the emissivity setting operation is finished.

Next, at step S15, the emissivity setting section 28b determines whether the depressed switch is the DOWN switch 30b or not. When it has been determined that the depressed switch is the DOWN switch 30b, the process proceeds to step S16. When it has been determined that the depressed switch is not the DOWN switch 30b, the process proceeds to step S18. When the process has proceeded to step S18, as the depressed switch is not either the UP switch or the DOWN switch 30b, it is determined that the depressed switch is the measuring switch 3. Then, a temperature measuring operation described later is carried out.

At step S16, the emissivity setting section 28b determines whether the emissivity is 0.90 or not. When the emissivity setting section 28b has determined at step S16 that the emissivity is not 0.90, the emissivity setting section 28b subtracts 0.01 from the existing emissivity e. At step S14, the display 4 displays this value for a predetermined period of time. Then, the emissivity setting operation is finished. When the emissivity setting section 28b has determined at step S16 that the emissivity is 0.90, the display 4 displays this value 0.90 as the value of the emissivity e for a predetermined period of time at step S14. Then, the emissivity setting operation is finished.

At step S18, a process similar to that at step S4 shown in FIG. 7 is carried out, that is, a temperature measuring of the object L under measurement is carried out. At step S19, a process similar to that at step S5 shown in FIG. 7 is carried out, that is, the operational circuit 28a determines whether the temperature measuring of the object L under measurement has been finished or not. When it has been determined at step S19 that the temperature measuring has been finished, the process proceeds to step S20. When it has been determined at step S19 that the temperature measuring has not yet been finished, the process returns to step S18.

At step S20, the display 4 displays the measured temperature of the object L under measurement for a predetermined period of time. Then, the temperature-measuring operation is finished.

As explained above, according to the present invention, it is possible to exclude an infrared ray that is emitted from a probe portion, then reflected from an object under measurement and that is finally incident to the introduction opening of the probe portion. Therefore, it is possible to obtain only the infrared ray emitted from the object under measurement. Thus, it is possible to calculate a body temperature more accurately.

Further, as the probe portion has a shape to fill almost all a hole portion of a living being when it is inserted into the hole portion of the living being, it is possible to prevent an infrared ray from coming out of a surrounding environment other than the eardrum or the external acoustic opening.

Further, as the body temperature calculating means includes a process of dividing the output of the infrared-ray detecting means by the emissivity, it is possible to obtain a value corresponding to an output of the infrared ray sensor obtained when the emissivity of the object under measurement is 1.00, which is necessary for obtaining the temperature of the object under measurement.

Further, when the temperature-measuring means for measuring the temperature of the infrared-ray detecting means is used also as the temperature-measuring means for measuring the temperature of the probe portion, it is possible to carry out a correction based on the emissivity without providing the temperature-measuring means for measuring the probe portion.

Further, when the temperature-measuring means for measuring the temperature of the infrared-ray detecting means and the temperature-measuring means for measuring the temperature of the probe portion are provided separately, it is possible to actually measure and use the temperature of the probe portion. Thus, it is possible to obtain more accurately a volume of infrared rays that are emitted from the object itself under measurement. As a result, it is possible to calculate a body temperature more accurately. In other words, even when the volume of infrared rays from other than the object under measurement increases due to a warming of the front end of the probe portion, the temperature of the warmed front end of the probe portion is measured. Therefore, it is possible to correct the increased volume.

Further, when a predetermined arithmetic expression is given as follows, the calculation becomes simple and the load of the calculating means can be reduced:

$$T_b = (T_0^4 + V_b/Ke)^{1/4}$$

where $T_b$ represents a temperature of the hole portion of the living being, $T_0$ represents a temperature of the infrared-ray detecting means, $V_b$ represents an output of the infrared-ray detecting means, K represents a constant, and e represents an emissivity of the hole portion of the living being.

Further, as the predetermined arithmetic expression is a linear expression that approximates a temperature ($T_b$) of the hole portion of the living being by a temperature ($T_0$) of the infrared-ray detecting means, an output ($V_b$) of the infrared-ray detecting means, and an emissivity (e) of the hole portion of the living being, the calculation becomes simple and the load of the calculating means can be reduced.

Further, when a predetermined arithmetic expression is given as follows, the calculation becomes simple and the load of the calculating means can be reduced.

$$T_b = T_0 + V_b/K_1 e$$

where $T_b$ represents a temperature of the hole portion of the living being, $T_0$ represents a temperature of the infrared-ray detecting means, $V_b$ represents an output of the infrared-ray detecting means, $K_1$ represents a constant, and e represents an emissivity of the hole portion of the living being.

Further, when a predetermined arithmetic expression is given as follows, it is possible to carry out the calculation more accurately.

$$T_b = \{[V_b/K + T_0^4 - (1-e)T_p^4]/e\}^{1/4}$$

where $T_b$ represents a temperature of the hole portion of the living being, $V_b$ represents an output of the infrared-ray detecting means, K represents a constant, $T_0$ represents a temperature of the infrared-ray detecting means, e represents an emissivity of the hole portion of the living being, and $T_p$ represents a temperature of the probe portion.

Further, the probe portion has a light-guiding pipe for guiding an infrared ray emitted from the introduction opening to the infrared ray sensor and case means for covering the light-guiding pipe, with a space formed between the light-guiding pipe and the case means, and the second temperature-measuring means is provided between the case means and the light-guiding pipe such that the second temperature-measuring means is in contact with the case means but is not in contact with the light-guiding pipe. Therefore, it is possible to measure the temperature of the case means more accurately, without being influenced by the temperature of the light-guiding pipe.

Further, a member of the front end of the probe portion has a thermal capacity to such extent that a temperature does not change suddenly during a period of time required for calculating a body temperature of the living being. Therefore, it does not occur that the temperature of the probe portion changes during the measuring of the body temperature so that the emissivity does not match. Further, there is no change in the number of infrared rays emitted from the front end of the probe portion. As a result, errors will not occur easily.

Further, as a member of the front end of the probe portion is a window member provided at the introduction opening, it is possible to obtain a body temperature more accurately by providing a thermal capacity, which does not permit a sudden change in temperature during a time required for calculating the body temperature of a living being, to the window member that has a large area of exposure within the external acoustic opening.

Further, the window member is calcium fluoride, silicon or barium fluoride having a thickness of 0.3 mm or more. Therefore, it is possible to provide the window member with a thermal capacity which does not permit a sudden change in temperature during a time required for calculating the body temperature of a living being.

Further, as the emissivity is set to 0.90 to 0.98, it is possible to obtain only the infrared ray emitted from the eardrum or the external acoustic opening at the time of measuring a body temperature from the external acoustic opening of a human body. Thus, it is possible to calculate the body temperature more accurately.

Further, the radiation thermometer has emissivity setting means for setting the emissivity. Therefore, it is possible to set an emissivity that matches the shape of the external acoustic opening of a person whose body temperature is being measured. This makes it possible to avoid individual differences and to measure a body temperature more accurately.

Further, as an emissivity of the hole portion of the living being when the emissivity is less than one or 1.00 is selected as the emissivity of an object under measurement, it is possible to carry out both a normal body temperature measuring and a measuring for examination using a black body.

Further, as an emissivity is selected according to the operation of the measuring switch for starting a measuring operation, it is possible to carry out both a setting of the emissivity and a body temperature measuring with a smaller number of switches.

POTENTIAL OF INDUSTRIAL UTILIZATION

The present invention is applied to a radiation thermometer for measuring a temperature of a living being by utilizing a hole portion of the living being as well as, of course, for measuring a temperature of a human body.

What is claimed is:

1. A radiation thermometer comprising:
    infrared-ray detecting means;
    a probe portion having a front end to be inserted into a hole portion of a living being and an introduction opening provided at the front end for guiding an infrared ray emitted from the hole portion of the living being to the infrared-ray detecting means;
    temperature-measuring means for measuring a temperature of the probe portion; and
    calculating means for calculating a body temperature of the living being based on output of the infrared-ray detecting means and output of the temperature-measuring means,
    wherein said probe portion has such a shape as to fill almost the hole portion of the living being while the probe portion is being inserted into the hole portion of the living being; and
    wherein said calculating means calculates the body temperature of said living being by correcting an error caused by the infrared ray radiated from the probe portion inserted into the hole portion of the living being, reflected inside the hole portion and emitted into the introduction opening.

2. A radiation thermometer according to claim 1, wherein said calculating means calculates the body temperature of the living being according to a predetermined arithmetic expression based on the output of said temperature-measuring means and an emissivity of the hole portion of the living being and said correction is made by setting the emissivity to be less than 1.

3. A radiation thermometer according to claim 2, wherein the calculating means includes a processing for dividing an output of the infrared-ray detecting means by the emissivity.

4. A radiation thermometer according to claim 1, wherein the temperature-measuring means serves as temperature-measuring means for measuring a temperature of the infrared-ray detecting means.

5. A radiation thermometer according to claim 1, wherein the temperature-measuring means comprises a first temperature-measuring means for measuring a temperature of the probe portion and a second temperature-measuring means for measuring a temperature of the infrared-ray detecting means.

6. A radiation thermometer according to claim 2, wherein the predetermined arithmetic expression is $$T_b = (T_0^4 + V_b/Ke)^{1/4}$$

where $T_b$ represents a temperature of the hole portion of the living being, $T_0$ represents a temperature of the infrared-ray detecting means, $V_b$ represents an output of the infrared-ray detecting means, K represents a constant, and e represents an emissivity of the hole portion of the living being.

7. A radiation thermometer according to claim 2, wherein the predetermined arithmetic expression is a linear expression that approximates a temperature ($T_b$) of the hole portion of the living being by a temperature ($T_0$) of the infrared-ray detecting means, an output ($V_b$) of the infrared-ray detecting means, and an emissivity (e) of the hole portion of the living being.

8. A radiation thermometer according to claim 7, wherein the predetermined arithmetic expression is $$T_b = T_0 + V_b/K_1 e$$

where $T_b$ represents a temperature of the hole portion of the living being, $T_0$ represents a temperature of the infrared-ray detecting means, $V_b$ represents an output of the infrared-ray detecting means, $K_1$ represents a constant, and e represents an emissivity of the hole portion of the living being.

9. A radiation thermometer according to claim 2, wherein the predetermined arithmetic expression is $$T_b = \{[V_b/K + T_0^4 - (1-e)T_p^4]/e\}^{1/4}$$

where $T_b$ represents a temperature of the hole portion of the living being, $V_b$ represents an output of the infrared-ray detecting means, K represents a constant, $T_0$ represents a temperature of the infrared-ray detecting means, e represents an emissivity of the hole portion of the living being, and $T_p$ represents a temperature of the probe portion.

10. A radiation thermometer according to claim 5, wherein the probe portion has a light-guiding pipe for guiding an infrared ray emitted from the introduction opening to the infrared ray sensor and case means for covering the light-guiding pipe, with a space formed between the light-guiding pipe and the case means, and the second temperature-measuring means is provided between the case means and the light-guiding pipe such that the second temperature-measuring means is in contact with the case means but is not in contact with the light-guiding pipe.

11. A radiation thermometer according to claim 1, wherein a member of the front end of the probe portion has a thermal capacity to such extent that a temperature does not change suddenly during a period of time required for calculating a body temperature of the living being.

12. A radiation thermometer according to claim 11, wherein a material of the front end of the probe portion is a window member provided at the introduction opening.

13. A radiation thermometer according to claim 12, wherein the window member is made of calcium fluoride, silicon or barium fluoride having a thickness of 0.3 mm or more.

14. A radiation thermometer according to claim 1, wherein the hole portion of the living being is an external acoustic opening of a human being, and the emissivity is set to 0.90 to 0.98.

15. A radiation thermometer according claim 1, wherein the radiation thermometer has emissivity setting means for setting the emissivity.

16. A radiation thermometer according to claim 1, wherein the radiation thermometer has a peak value detecting means for detecting a peak value of the infrared-ray detecting means, and an output of the infrared-ray detecting means that is used by the calculating means for the calculation is the peak value.

17. A radiation thermometer according to claim 2 further comprising emissivity selecting means for setting the emissivity of said hole portion of the living being to be either less than 1 or 1.

18. A radiation thermometer according to claim 17, wherein the radiation thermometer has a measuring switch for starting a measuring operation, and the emissivity selecting means selects an emissivity according to the operation of the measuring switch.

* * * * *